(12) United States Patent
Kim et al.

(10) Patent No.: US 11,285,939 B2
(45) Date of Patent: Mar. 29, 2022

(54) SMART PARKING ASSIST SYSTEM AND CONTROL METHOD THEREOF

(71) Applicant: MANDO MOBILITY SOLUTIONS CORPORATION, Gyeonggi-do (KR)

(72) Inventors: Jae Suk Kim, Gyeonggi-do (KR); Tak Gen Kim, Gyeonggi-do (KR)

(73) Assignee: MANDO MOBILITY SOLUTIONS CORPORATION, Gyeonggi-Do (KR)

( * ) Notice: Subject to any disclaimer, the term of this patent is extended or adjusted under 35 U.S.C. 154(b) by 370 days.

(21) Appl. No.: 15/981,876

(22) Filed: May 16, 2018

(65) Prior Publication Data
US 2018/0362023 A1 Dec. 20, 2018

(30) Foreign Application Priority Data
Jun. 14, 2017 (KR) .......................... 10-2017-0074700

(51) Int. Cl.
*B60W 30/06* (2006.01)
*B60W 50/14* (2020.01)
(Continued)

(52) U.S. Cl.
CPC ............ *B60W 30/06* (2013.01); *B60W 50/14* (2013.01); *B62D 15/027* (2013.01); *G06V 20/586* (2022.01); *B60W 2050/146* (2013.01)

(58) Field of Classification Search
None
See application file for complete search history.

(56) References Cited

U.S. PATENT DOCUMENTS 8,350,724 B2 * 1/2013 Szczerba ............ G06K 9/00798
340/932.2
2011/0095910 A1 * 4/2011 Takano .................... B60R 1/00
340/932.2
(Continued)

FOREIGN PATENT DOCUMENTS

CN 202080275 12/2011
CN 102910166 2/2013
(Continued)

OTHER PUBLICATIONS

Loell Jann; Machine Translation of DE-102008020561-A1; Oct. 2009; espacenet.com (Year: 2009).*
(Continued)

*Primary Examiner* — David P. Merlino
(74) *Attorney, Agent, or Firm* — Ladas & Parry, LLP

(57) ABSTRACT

The present embodiments relate to a smart parking assist system and a control method thereof, and display the ratios of the progress distance and the remaining distance of the vehicle based on the distance by which the vehicle must move in the path set for each period in which automatic parking control is performed by a smart parking assist system, thereby allowing the driver to easily recognize the automatic parking control state of the vehicle and the distance by which the vehicle must move. Accordingly, the present embodiments may provide the driver with information on the automatic parking control state for each period of the automatic parking control, and may enable the driver to drive the vehicle to an accurate control position without exceeding the same in the period in which the vehicle is moved straight by the manual operation of the driver during the automatic parking control period.

20 Claims, 8 Drawing Sheets

(51) Int. Cl.
  *B62D 15/02* (2006.01)
  *G06V 20/58* (2022.01)

(56) References Cited

U.S. PATENT DOCUMENTS

| | | | | |
|---|---|---|---|---|
| 2011/0251755 | A1* | 10/2011 | Widmann | B62D 15/027 |
| | | | | 701/36 |
| 2013/0096816 | A1 | 4/2013 | Takano et al. | |
| 2015/0258989 | A1* | 9/2015 | Okano | B62D 15/028 |
| | | | | 701/1 |
| 2017/0028985 | A1* | 2/2017 | Kiyokawa | B62D 15/0285 |
| 2017/0129486 | A1* | 5/2017 | Nakada | B62D 15/027 |
| 2019/0027042 | A1* | 1/2019 | Fujishima | B60W 30/06 |
| 2020/0039372 | A1* | 2/2020 | Saita | B60L 53/36 |

FOREIGN PATENT DOCUMENTS

| | | |
|---|---|---|
| DE | 102008020561 A1 * 10/2009 | G08G 1/168 |
| DE | 10 2010 020 206 | 11/2011 |
| DE | 10 2010 022 716 | 12/2011 |
| DE | 10 2013 216 367 | 2/2015 |
| KR | 10-2012-0040827 | 4/2012 |
| KR | 10-1457258 | 11/2014 |
| KR | 10-1553868 | 9/2015 |

OTHER PUBLICATIONS

Office Action dated Apr. 24, 2019 for Korean Patent Application No. 10-2017-0074700 and its English machine translation by Google Translate.

Office Action dated Sep. 21, 2018 for Korean Patent Application No. 10-2017-0074700 and its English machine translation by Google Translate.

Office Action dated Dec. 1, 2020 for Chinese Application No. 201810606235.3 and its English machine translation by Google Translate.

Office Action dated Apr. 21, 2021 for German Patent Application No. 10 2018 208 412.2 and its English translation from Google Translate.

* cited by examiner

FIG.3
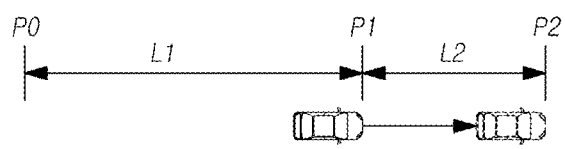
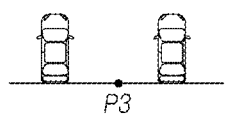
Deactivated initial screen
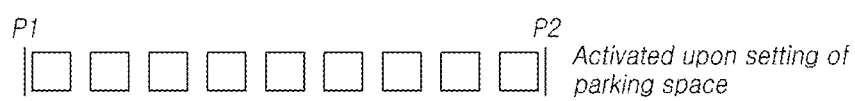
Activated upon setting of parking space
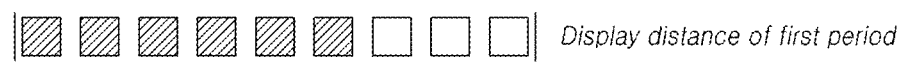
Display distance of first period
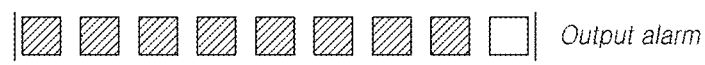
Output alarm

FIG.4
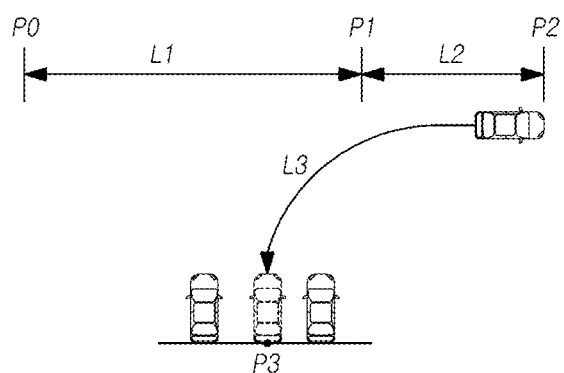
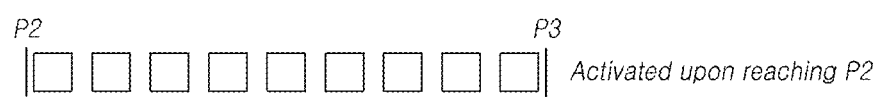 Activated upon reaching P2
 Display distance of second period
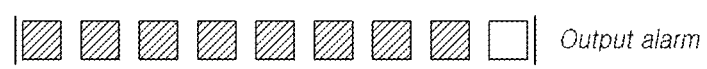 Output alarm FIG.5
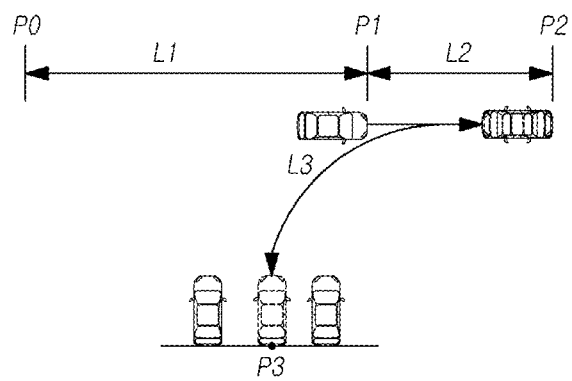
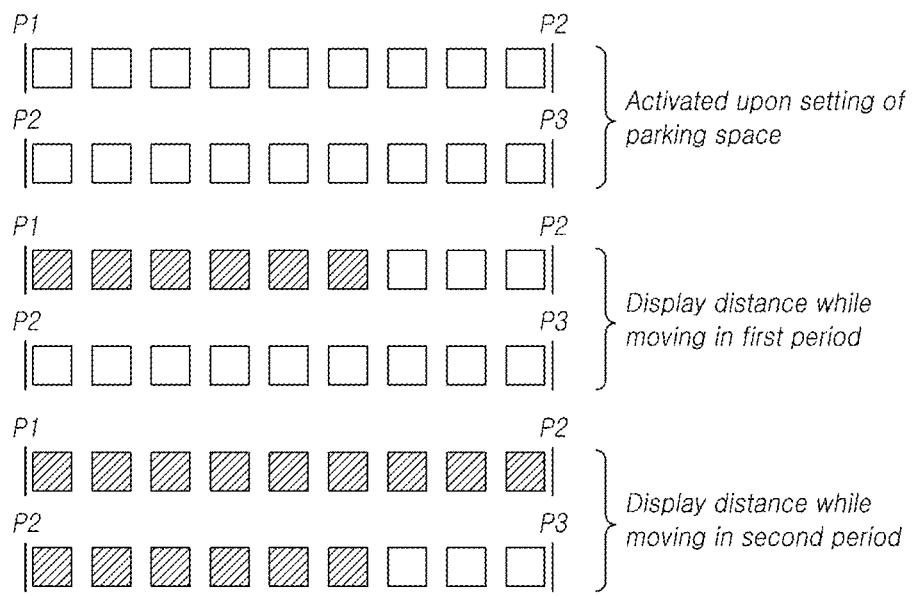

FIG.6
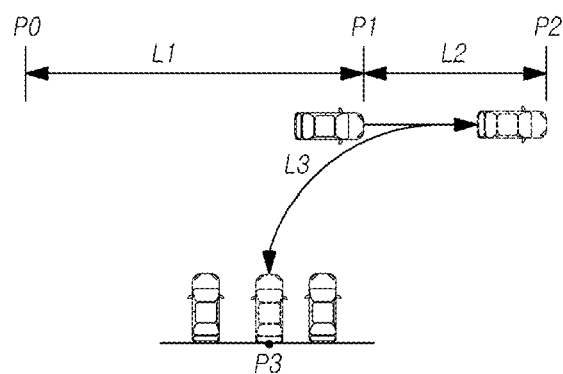
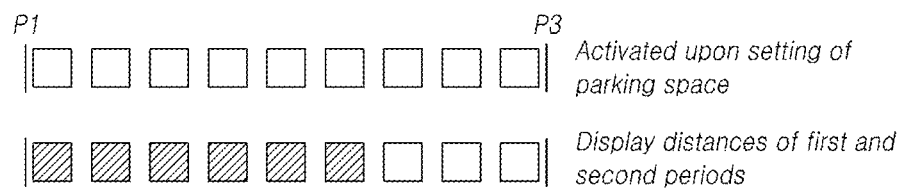

SMART PARKING ASSIST SYSTEM AND CONTROL METHOD THEREOF

CROSS REFERENCE TO RELATED APPLICATION

This application claims priority from Korean Patent Application No. 10-2017-0074700, filed on Jun. 14, 2017, which is hereby incorporated by reference for all purposes as if fully set forth herein.

BACKGROUND OF THE INVENTION

1. Field of the Invention

The present embodiments relate to a smart parking assist system for assisting a driver in parking a vehicle and a control method thereof.

2. Description of the Prior Art

Growing demands for the safety and convenience of a driver, as well as for the performance of a vehicle, have brought about various studies on and developments of a Driver Assist System (DAS) that supports a vehicle operation of a driver through control by the vehicle.

Such a Driver Assist System (DAS) includes a system that assists the driver in driving the vehicle or assists control of the vehicle so as to protect the driver from an emergency occurring while the driver is driving.

In addition, a Smart Parking Assist System (SPAS) is provided to control the vehicle in parking the vehicle, instead of manually driving the vehicle, thereby assisting the driver in parking the vehicle.

When Smart Parking Assist System (SPAS) receives an automatic parking control command, the Smart Parking Assist System (SPAS) searches the surrounding space of the vehicle to set a parking space, and controls the movement of the vehicle to the set parking space, thereby completing parking.

At this time, the Smart Parking Assist System (SPAS) controls the movement of the vehicle from an automatic parking control start position to an automatic parking control end position, but does not support the movement of the vehicle from the position of the vehicle at the time at which the parking space is set to the automatic parking control start position.

Therefore, the driver must move the vehicle to the automatic parking control start position by manual operation. In this case, the vehicle frequently goes beyond the automatic parking control start position. In addition, if the vehicle fails to reach the accurate automatic parking control start position, there is a problem that it is difficult to perform the automatic parking control by the smart parking assist system (SPAS).

Furthermore, there is an inconvenience in which the driver does not know the movement distance required for the parking end or the end time of the automatic parking accurately while the vehicle is moving from the automatic parking control start position to the automatic parking control end position under the control of the Smart Parking Assist System (SPAS).

SUMMARY OF THE INVENTION

An aspect of the present embodiments is to provide a smart parking assist system that allows a driver to accurately know the distance by which the driver must move the vehicle for automatic parking control in a manual operation period by the driver during the automatic parking control operation by the smart parking assist system, thereby controlling the vehicle.

Another aspect of the present embodiments is to provide a smart parking assist system that allows the driver to identify information on the movement distance for each control period of the vehicle by the smart parking assist system when the vehicle is controlled by the smart parking assist system after the time of setting a parking space to the time at which the automatic parking control ends.

According to one aspect, the present embodiments provide a smart parking assist system that may include: a parking space determining unit that searches the surrounding space of a vehicle by means of a sensor mounted on the vehicle and sets a parking space for automatic parking of the vehicle when the parking space determining unit receives an automatic parking control command; and an automatic parking control unit that, when the parking space determining unit sets the parking space, sets a path through which the vehicle moves to the parking space, controls the movement of the vehicle in at least a portion of the period in which the vehicle moves according to the set path, and calculates a progress distance and the remaining distance of the vehicle in the set path depending on the movement of the vehicle.

According to another aspect, the present embodiments provide a method for controlling a smart parking assist system, which may include: when an automatic parking control command is input, searching the surrounding space of a vehicle by means of a sensor mounted on the vehicle and setting a parking space for automatic parking of the vehicle; setting a path through which the vehicle moves to the parking space; controlling the movement of the vehicle in at least a portion of a period in which the vehicle moves according to the set path; and simultaneously displaying the ratios of the progress distance and the remaining distance of the vehicle to the set path using figures depending on the movement of the vehicle.

According to the present embodiments, it is possible to provide convenience to the driver and to perform accurate automatic parking control by means of the smart parking assist system by providing information on the distance by which the vehicle must move to a position required for automatic parking control in a period in which the vehicle is moved by a manual operation of the driver during the period in which the smart parking assist system operates.

According to the present embodiments, information on the distance by which the vehicle must move for each period in which the automatic parking control of the vehicle is performed by the smart parking assist system. Therefore, it is possible to allow the driver to easily recognize the automatic parking control state by being provided with information related to the movement of the vehicle in each period of the automatic parking control operation.

BRIEF DESCRIPTION OF THE DRAWINGS

The above and other aspects, features, and advantages of the present disclosure will be more apparent from the following detailed description taken in conjunction with the accompanying drawings, in which:

FIGS. 3 to 6 are diagrams illustrating examples of displaying distance information related to the movement of a vehicle in a period in which automatic parking control is performed by a smart parking assist system according to the present embodiments.

DETAILED DESCRIPTION OF THE EXEMPLARY EMBODIMENTS

Figure 1:
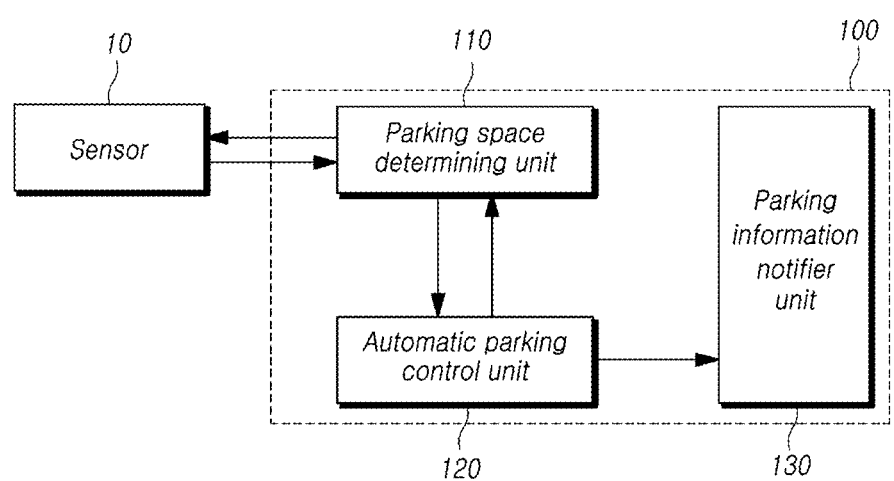
FIG. 1 is a diagram showing a schematic configuration of a smart parking assist system according to the present embodiments.

Hereinafter, some embodiments of the present disclosure will be described in detail with reference to the accompanying illustrative drawings. In designating elements of the drawings by reference numerals, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. These terms are merely used to distinguish one component from other components, and the property, order, sequence and the like of the corresponding component are not limited by the corresponding term. In the case that it is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element.

FIG. 1 is a diagram showing a schematic configuration of a smart parking assist system 100 according to the present embodiments.

Referring to FIG. 1, the smart parking assist system 100, according to the present embodiment, includes a parking space determining unit 110 for setting a parking space for automatic parking of a vehicle, an automatic parking control unit 120 for controlling automatic parking of a vehicle, and a parking information notification unit 130 for providing information on the movement distance of a vehicle in the automatic parking control state.

When parking space determining unit 110 receives an automatic parking control command, the parking space determining unit 110 searches the surrounding space of a vehicle through a sensor 10 mounted on the vehicle.

The parking space determining unit 110 searches the surrounding space of the vehicle and, if a space available for parking the vehicle is found, sets the space as a parking space. Then, the parking space determining unit 110 transmits information stating that the parking space has been set and information on the set parking space to the automatic parking control unit 120.

When the parking space for automatic parking of the vehicle is set by the parking space determining unit 110, the automatic parking control unit 120 controls the parking of the vehicle to the set parking space.

More specifically, when the parking space is set, the automatic parking control unit 120 sets a path through which the vehicle moves from the current position of the vehicle to the parking space, and controls the movement of the vehicle according to the set path.

The automatic parking control unit 120 may control the movement of the vehicle in a first period in which the movement of the vehicle is controlled from the position in which the parking space is set to the position in which the automatic parking control of the vehicle is started and in a second period in which the movement of the vehicle is controlled from the automatic parking control start position to an automatic parking control end position.

The automatic parking control unit 120 may allow the movement of the vehicle to be controlled by a manual operation of the driver in the first period, and may control the movement of the vehicle in the second period when the vehicle reaches the automatic parking control start position, thereby performing the automatic parking.

That is, since the path from the position of the vehicle at the time at which the parking space is set to the position in which the automatic parking control is started is straight, the vehicle may be moved by the manual operation of the driver. In addition, since the path from the automatic parking control start position to the automatic parking control end position is a curve along which the vehicle reverses, the movement of the vehicle is controlled by the automatic parking control unit 120, thereby providing convenience to the driver.

Although the path from the position of the vehicle at the time at which the parking space is set to the automatic parking control start position is straight, the vehicle may not reach the accurate automatic parking control start position only by the manual operation of the driver.

In this case, the automatic parking control may not be performed by the automatic parking control unit 120 because the vehicle does not correctly reach the automatic parking control start position.

In order to solve such a problem, the present embodiments can simultaneously display a progress distance and the remaining distance with respect to the distance by which the vehicle must move depending on the movement of the vehicle while the automatic parking control is performed.

The automatic parking control unit 120 calculates the progress distance and the remaining distance of the vehicle based on the distance by which the vehicle must move in the path set for automatic parking of the vehicle while the automatic parking control of the vehicle is performed.

Then, the calculated progress distance and remaining distance are displayed through the parking information notification unit 130 so that the driver can intuitively perceive the distance by which the vehicle must move.

The automatic parking control unit 120 may calculate the progress distance and the remaining distance of the vehicle based on the distance by which the vehicle must move during the first period in which the vehicle moves from the position at the time at which the parking space is set to the automatic parking control start position, and may display information on the progress distance and the remaining distance through the parking information notification unit 130.

In addition, the automatic parking control unit 120 may calculate the progress distance and the remaining distance of the vehicle based on the distance by which the vehicle must move during the second period in which the vehicle moves from the automatic parking control start position to the automatic parking control end position, and may display the related information through the parking information notification unit 130.

Thus, it is possible to allow the driver to easily recognize the remaining distance in the first period by the manual operation of the driver during the period in which the automatic parking control is performed, so that it is possible to control the vehicle so as not to move beyond the automatic parking control start position.

In addition, the progress distance and the remaining distance are also displayed for the second period in which the vehicle is controlled by the automatic parking control unit 120, so that the driver can easily recognize the movement state until the time at which the automatic parking control is finished.

The parking information notification unit 130 displays the progress distance and the remaining distance of the vehicle calculated by the automatic parking control unit 120 in the form of a graph using figures, such as a bar or a circle, thereby allowing the driver to easily perceive the same.

The distance information on the first period and the second period of the automatic parking control period may be separately or simultaneously displayed, or it is possible to display the progress distance and the remaining distance in the entire period when the vehicle control is performed by the automatic parking control unit 120 for both the first period and the second period.

The parking information notification unit 130 may sound an alarm when the ratio of the remaining distance to the distance by which the vehicle must move in each movement period of the vehicle is less than a specific ratio while the vehicle is moving.

For example, if the remaining distance of the vehicle to the automatic parking control start position in the first period is equal to or less than 10% of the distance by which the vehicle must move during the first period, the parking information notification unit 130 may sound an alarm so that the driver can control the vehicle so as to reach the accurate automatic parking control position without exceeding the same.

If the remaining distance to the automatic parking control end position of the vehicle in the second period is equal to or less than a specific rate, the parking information notification unit 130 may sound an alarm so that the driver can recognize the end of the automatic parking control.

Figure 2:
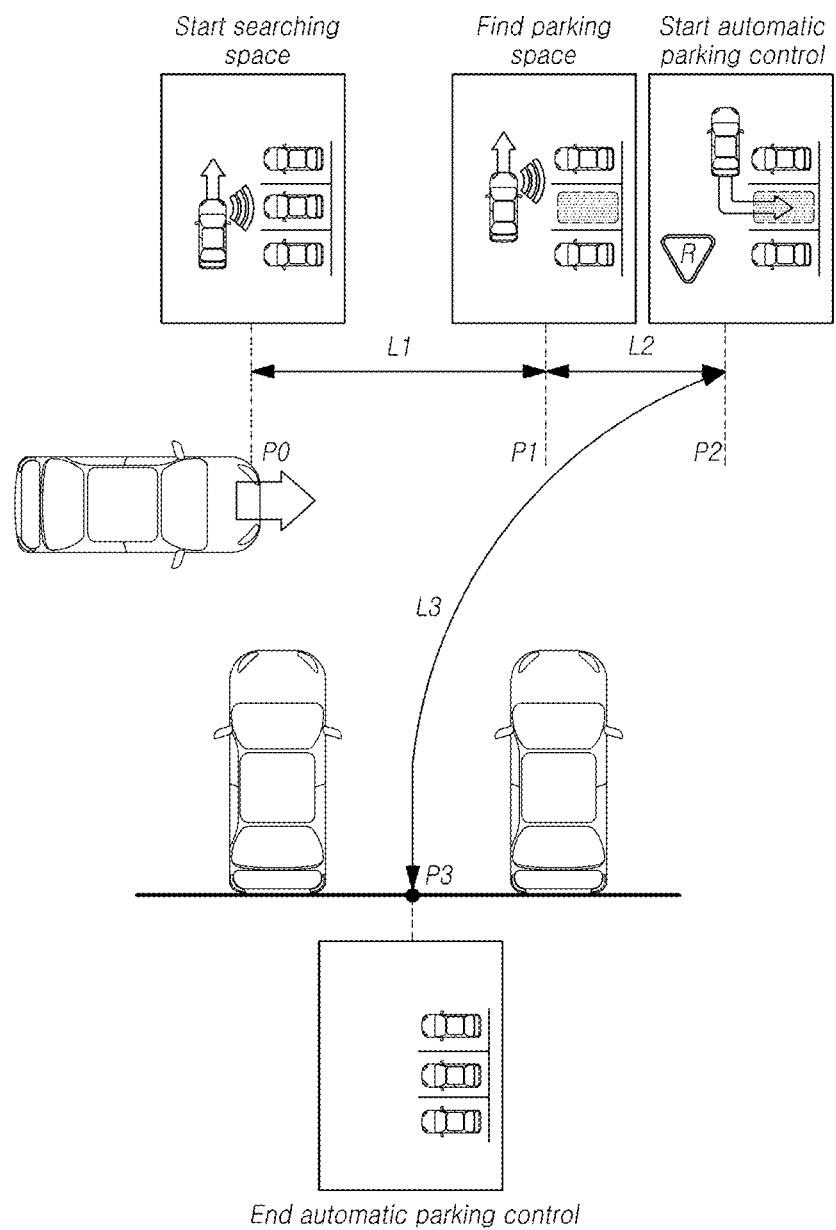
FIG. 2 is a diagram illustrating an example of the case in which automatic parking control is performed by a smart parking assist system according to the present embodiments.

FIG. 2 is a diagram illustrating an example of the case in which automatic parking control is performed by a smart parking assist system 100 according to the present embodiments.

Referring to FIG. 2, when the parking space determining unit 110 receives an automatic parking control command at the point P0, the parking space determining unit 110 starts searching the surrounding space of the vehicle.

At this time, the vehicle may be moved by a manual operation of the driver or by the control of the vehicle, and the movement path of the vehicle cannot be accurately determined until a parking space is found. Thus, information on the progress distance and the remaining distance of the vehicle is not displayed.

When the parking space determining unit 110 finds a space for automatic parking of the vehicle at the point P1, the parking space determining unit 110 sets the space as a parking space and transmits information on the set parking space to the automatic parking control unit 120.

The automatic parking control unit 120 sets a path through which the vehicle must move for automatic parking of the vehicle based on the current position and the set parking space.

For example, as shown in FIG. 2, a path may be set such that the vehicle moves from the point P1 to the point P2, and then moves from the point P2 to the point P3.

Here, the point P2 is the position in which the automatic parking control of the vehicle is started, and the point P3 is the position in which the automatic parking control of the vehicle is terminated.

Therefore, the period in which the vehicle moves from the point P1 to the point P2 corresponds to the first period, and the period in which the vehicle moves from the point P2 to the point P3 corresponds to the second period.

The vehicle must move by a distance of L2 during the first period and must move by a distance of L3 during the second period.

The automatic parking control unit 120 calculates a progress distance and the remaining distance of the vehicle based on the total distance L2 while the vehicle moves from the point P1 to the point P2 during the first period, and displays information on the calculated distances through the parking information notification unit 130.

In addition, the automatic parking control unit 120 calculates a progress distance and the remaining distance of the vehicle based on the total distance L3 while the vehicle moves from the point P2 to the point P3 during the second period, and displays information on the calculated distances through the parking information notification unit 130.

If the automatic parking control unit 120 controls the vehicle in both the first period and the second period, the progress distance and the remaining distance are displayed so that the driver can easily recognize the automatic parking control state. If the vehicle is moved by the manual operation of the driver in the first period, the driver can intuitively perceive the remaining distance, thereby enabling the vehicle to reach the accurate automatic parking control start position.

FIGS. 3 to 6 illustrate examples of displaying a progress distance and the remaining distance of the vehicle through the parking information notification unit 130 while the automatic parking control is performed by a smart parking assist system 100 according to the present embodiments.

FIG. 3 shows a method of displaying a progress distance and the remaining distance in the first period in which a parking space is set and the vehicle moves to the automatic parking control start position.

Referring to FIG. 3, the parking information notification unit 130 may be in the inactive state before a parking space is set by the parking space determining unit 110.

When a parking space is set by the parking space determining unit 110 at the point P1, the parking information notification unit 130 is activated to thus display a progress distance and the remaining distance of the vehicle using the point P1 as a start point and the point P2 as an end point because the vehicle moves from the point P1 to the point P2 by path-calculation of the automatic parking control unit 120.

The parking information notification unit 130 simultaneously displays the ratios of the progress distance and the remaining distance based on a distance L1 by which the vehicle must move in the first period in which the vehicle moves from the point P1 to the point P2.

Although the distances may be displayed in the form of a bar-shaped graph as shown in FIG. 3, in addition thereto, the distances may be displayed in the form of a circle or the like, and the display of the distances are not limited to a specific form.

Although the shapes of the figures are not limited, the ratios of the progress distance and the remaining distance may be simultaneously displayed based on the total distance by which the vehicle must move in each period using the figures, thereby allowing the driver to intuitively perceive the remaining distance out of the distance by which the vehicle must move.

In addition, when the vehicle approaches the point P2, and when the remaining distance is equal to or less than a specific percentage of the total distance by which the vehicle must move, an alarm may be output to allow the driver to perceive the state in which the vehicle is reaching the point P2.

FIG. 4 shows a method of displaying a progress distance and the remaining distance in the second period in which the vehicle moves from the automatic parking control start position to the automatic parking control end position.

Referring to FIG. 4, when the vehicle arrives at the point P2 in the first period, the vehicle temporarily stops and then reverses toward the point P3, which is the automatic parking control end position.

Therefore, when the vehicle reaches the point P2, the distance information display between the points P1 and P2 is terminated, and a new distance information display is activated using the point P2 as a start point and the point P3 as an end point.

When the vehicle moves from the point P2 to the point P3, the automatic parking control unit 120 calculates a progress distance and the remaining distance of the vehicle based on the total distance L3 by which the vehicle must move, and displays the ratios of the progress distance and the remaining distance using figures through the parking information notification unit 130.

A change in the ratios of the progress distance and the remaining distance is displayed depending on the movement of the vehicle during the second period, and if the remaining distance to the point P3 is equal to or less than a specific ratio of L3, an alarm may be output.

Therefore, according to the present embodiments, when the path through which the vehicle must move for automatic parking of the vehicle and the distances L2 and L3 along the path are calculated, the ratios of the progress distance and the remaining distance depending on the movement of the vehicle is displayed for each period using figures, thereby allowing the driver to easily identify the automatic parking control state and the moving state of the vehicle.

The ratios of the progress distance and the remaining distance is displayed based on the total distance, thereby helping the driver in intuitively perceiving the remaining distance to the progress distance.

FIG. 5 shows the case of simultaneously displaying information on both the progress distance and the remaining distance of the vehicle during the first period and the second period in the automatic parking control state.

Referring to FIG. 5, when the vehicle reaches the point P1 in which a parking space is set, the automatic parking control unit 120 calculates the path from the point P1 to the point P2 and the path from the point P2 to the point P3.

When the movement path and movement distance in the first period and the movement path and movement distance in the second period are calculated, the automatic parking control unit 120 simultaneously displays distance information on the first period and distance information on the second period in separate areas through the parking information notification unit 130.

The screen for displaying the distance information is activated when the parking space is set, and displays the ratios of the progress distance and the remaining distance of the vehicle to the distance L2 in the first period while the vehicle moves from the point P1 to the point P2.

When the vehicle moves from the point P2 to the point P3 after arriving at the point P2, the ratios of the progress distance and the remaining distance of the vehicle is displayed based on the distance L3 in the second period.

The distance information on the first period and the second period is displayed in separate areas at the same time in the automatic parking control state of the vehicle so that the driver can easily recognize the entire automatic parking control state, the remaining distance by which the vehicle must move in each period, and a change in the automatic parking control state.

FIG. 6 shows the case where information on the progress distance and the remaining distance of the vehicle is integrated and displayed in the first period and the second period.

Referring to FIG. 6, when the vehicle reaches the point P1 and the parking space is set, the path for automatic parking control of the vehicle and the total distance (L2+L3) by which the vehicle must move are calculated.

The automatic parking control unit 120 allows the parking information notification unit 130 to display the ratios of the progress distance and the remaining distance of the vehicle to the total distance by which the vehicle must move from the time of setting the parking space at which the distance by which the vehicle must move for the automatic parking control is calculated.

When the automatic parking control unit 120 controls the vehicle after the setting of the parking space, the progress distance and the remaining distance of the vehicle are displayed based on the total distance by which the vehicle must move, thereby allowing the driver to recognize the remaining distance until the end of the automatic parking control in the state in which the automatic parking control unit 120 controls the vehicle.

Figure 7:
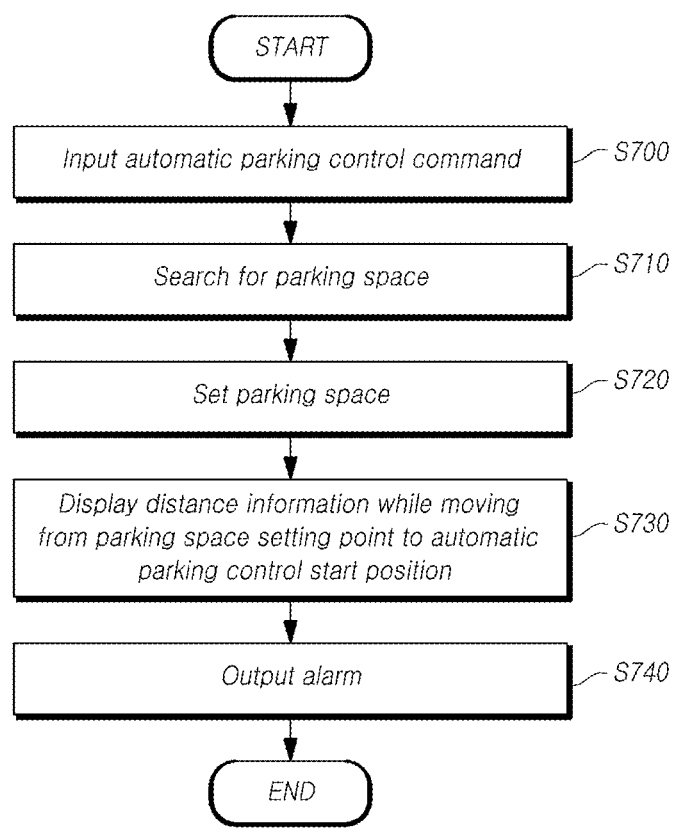
FIGS. 7 and 8 are flowcharts illustrating a process in which automatic parking control is performed by a smart parking assist system according to the present embodiments.
Figure 8:
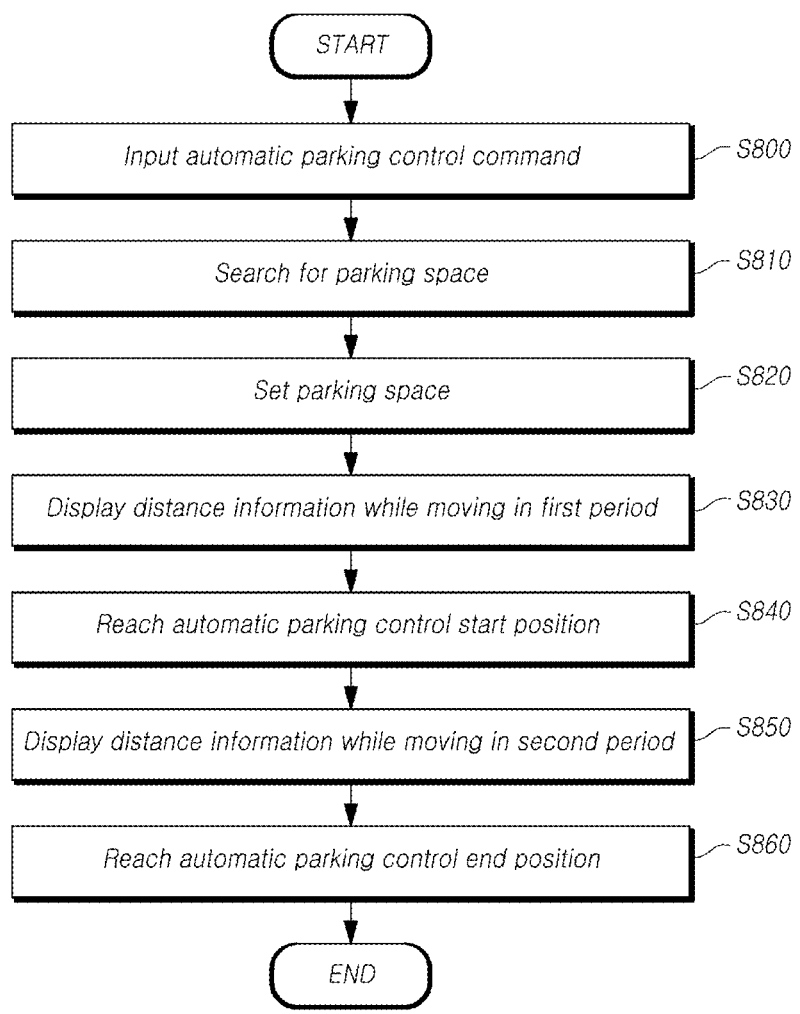

FIGS. 7 and 8 illustrate a process in which a smart parking assist system 100 controls the automatic parking of the vehicle according to the present embodiments.

FIG. 7 shows the case where the smart parking assist system 100 performs the automatic parking control only in the second period, among the first period and the second period of the automatic parking control.

Referring to FIG. 7, when the smart parking assist system 100 receives an automatic parking control command (S700), the smart parking assist system 100 searches the surrounding space of the vehicle by means of a sensor mounted on the vehicle (S710).

If the smart parking assist system 100 finds a space available for the parking of the vehicle by searching the surrounding space, the smart parking assist system 100 sets the found space as a parking space (S720).

Then, the smart parking assist system 100 sets a path for the movement of the vehicle from the current position of the vehicle to the set parking space, wherein the movement path of the vehicle may include a first period in which the vehicle moves to the automatic parking control start position of the vehicle and a second period in which the vehicle moves from the automatic parking control start position to the automatic parking control end position.

Here, since the first period is a path through which the vehicle moves straight, the vehicle is moved by a manual operation of the driver in the first period, and when vehicle reaches the automatic parking control start position, the vehicle is moved by the control of the smart parking assist system 100 during the second period.

The driver may have a difficulty in driving the vehicle to the exact automatic parking control start position because the vehicle is moved by the manual operation of the driver in the first period.

Accordingly, the smart parking assist system 100 displays information on the progress distance and the remaining distance of the vehicle on the basis of the distance by which the verification must move from the parking space setting point, which is the current position of the vehicle, to the automatic parking control start position during the first period (S730).

In addition, if the remaining distance to the automatic parking control start position is equal to or less than a specific percentage of the distance by which the vehicle must move in the first period, an alarm may be output (S740).

In this way, information on the progress distance and the remaining distance of the vehicle during the first period in which the vehicle is moved by the manual operation of the driver in the automatic parking control state is displayed, thereby enabling the driver to drive the vehicle to the accurate automatic parking control start position.

Then, the automatic parking control is performed in the state in which the vehicle has reached the automatic parking control start position, thereby performing an effective automatic parking control of the vehicle.

FIG. 8 shows the case where automatic parking control is performed by the smart parking assist system 100 in both the first period and the second period of the automatic parking control.

Referring to FIG. 8, when the smart parking assist system 100 receives an automatic parking control command (S800), the smart parking assist system 100 searches the surrounding space of the vehicle by means of a sensor mounted on the vehicle (S810).

The smart parking assist system 100 sets a parking space available for the automatic parking of the vehicle by searching the surrounding space (s820), the smart parking assist system 100 sets a movement path from the current position of the vehicle to the parking space.

The smart parking assist system 100 displays a progress distance and the remaining distance of the vehicle on the basis of the distance by which the vehicle must move during the first period in which the vehicle moves from the current position to the automatic parking control start position (S830).

When the vehicle reaches the automatic parking control start position (S840), a progress distance and the remaining distance of the vehicle are displayed based on the distance by which the vehicle must move during the second period in which the vehicle moves from the automatic parking control start position to the automatic parking control end position (S850).

When the vehicle reaches the automatic parking control end position (S860), the smart parking assist system 100 ends the display of the information on the progress distance and the remaining distance of the vehicle.

Here, the distance information on the first period and the second period may be separately displayed, may be simultaneously displayed in separate areas of the same screen, or may be displayed based on the total distances of the first period and the second period.

Therefore, when the smart parking assist system 100 controls the vehicle from the time at which a parking space is set, the driver can easily perceive the progress distance and the remaining distance of the vehicle for each period of the automatic parking control state, thereby recognizing the automatic parking control state.

According to the present embodiments, the progress distance and the remaining distance of the vehicle are displayed on the basis of the distance by which the vehicle must move for each period while the smart parking assist system 100 performs the automatic parking, so that the driver can easily recognize the automatic parking control state of the vehicle and the distance by which the vehicle must move.

In particular, since the progress distance and the remaining distance of the vehicle are displayed in the period in which the vehicle is moved straight by the manual operation of the driver during the automatic parking control operation, the driver can drive the vehicle to the accurate automatic parking control start position, thereby facilitating the automatic parking control by the smart parking assist system 100.

The above embodiments of the present disclosure have been described only for illustrative purposes, and those skilled in the art will appreciate that various modifications and changes may be made thereto without departing from the scope and spirit of the disclosure. Therefore, the embodiments of the present disclosure are not intended to limit, but to illustrate the technical idea of the present disclosure, and the scope of the technical idea of the present disclosure is not limited by the embodiments. The scope of the present disclosure shall be construed on the basis of the accompanying claims in such a manner that all of the technical ideas included within the scope equivalent to the claims belong to the present disclosure.

What is claimed is:

1. A smart parking assist system comprising:
a parking space determining unit configured to search a surrounding space of a vehicle by a sensor mounted on the vehicle and find a parking space for automatic parking of the vehicle;
an automatic parking control unit configured to, when the parking space determining unit finds the parking space, generate a path for parking the vehicle from a position of the vehicle at a time which the parking space is found to the parking space, wherein the path for parking the vehicle includes a first path that a driver manually controls a movement of the vehicle from the position of the vehicle at the time which the parking space is found to an automatic parking control start position where the automatic parking control unit starts to control the movement of the vehicle and a second path that the automatic parking control unit controls the movement of the vehicle from the automatic parking control start position to the parking space; and
a parking information notification unit configured to:
display a first figure simultaneously showing a first progress distance and a first remaining distance of the vehicle in the first path that the driver manually controls the movement of the vehicle from the position of the vehicle at the time which the parking space is found to the automatic parking control start position, and a second figure simultaneously showing a second progress distance and a second remaining distance of the vehicle in the second path that the automatic parking control unit controls the movement of the vehicle from the automatic parking control start position to the parking space, and
output an alarm in response that a ration of the first remaining distance of the first path with respect to a total distance of the first path before the vehicle reaches the automatic parking control start position, or a ratio of the second remaining distance of the second path with respect to a total distance of the second path before the vehicle reaches the parking space is equal to or less than a predetermined ratio.

2. The smart parking assist system of claim 1, wherein the automatic parking control unit is configured to: control the movement of the vehicle according to the automatic parking control in the second path from the automatic parking control start position to the parking space.

3. The smart parking assist system of claim 1, wherein:
the first figure simultaneously displays a ratio of the first progress distance of the vehicle in the first path with respect to the total distance of the first path that the driver manually controls the movement of the vehicle from the position of the vehicle at the time which the parking space is found to the automatic parking control start position and the ratio of the first remaining distance of the vehicle in the first path with respect to the total distance of the first path, and
the second figure simultaneously displays a ratio of the second progress distance of the vehicle in the second path with respect to the total distance of the second path that the automatic parking control unit controls the movement of the vehicle from the automatic parking control start position to the parking space and the ratio of the second remaining distance of the vehicle in the second path with respect to the total distance of the second path.

4. The smart parking assist system of claim 3, wherein the parking information notification unit is configured to be activated when the parking space determining unit finds the parking space, display the ratios of the first progress distance and the first remaining distance of the first path that the driver manually controls the movement of the vehicle from the position of the vehicle at the time which the parking space is found to the automatic parking control start position, and, when the vehicle reaches the automatic parking control start position, display the ratios of the second progress distance and the second remaining distance in the second path that the automatic parking control unit controls the movement of the vehicle from the automatic parking control start position to the parking space.

5. The smart parking assist system of claim 1, wherein the parking information notification unit is configured to simultaneously display, in separate areas, information on a total distance of the first path that the driver manually controls the movement of the vehicle from the position of the vehicle at the time which the parking space is found to the automatic parking control start position and information on a total distance of the second path that the automatic parking control unit controls the movement of the vehicle from the automatic parking control start position to the parking space.

6. The smart parking assist system of claim 1, wherein:
the automatic parking control unit is configured to control the movement of the vehicle in the second path, and
the first figure displays a ratio of the first progress distance of the vehicle in the first path with respect to the total distance of the first path that the driver manually controls the movement of the vehicle from the position of the vehicle at the time which the parking space is found to the automatic parking control start position, and the ratio of the first remaining distance of the vehicle in the first path with respect to the total distance of the first path.

7. The smart parking assist system of claim 1, wherein the second figure displays a ratio of the second progress distance of the vehicle in the second path with respect to the total distance of the second path from the time at which automatic parking control of the vehicle is started by the automatic parking control unit to the time at which the automatic parking control of the vehicle is finished, and the ratio of the second remaining distance of the vehicle in the second path with respect to the total distance of the second path from the time at which the automatic parking control of the vehicle is started by the automatic parking control unit to the time at which the automatic parking control of the vehicle is finished.

8. The smart parking assist system of claim 1, wherein:
the first figure shows a ratio between the first progress distance and the first remaining distance of the vehicle in the first path that the driver manually controls the movement of the vehicle from the position of the vehicle at the time which the parking space is found to the automatic parking control start position, and
the second figure shows a ratio between the second progress distance and the second remaining distance of the vehicle in the second path that the automatic parking control unit controls the movement of the vehicle from the automatic parking control start position to the parking space.

9. The smart parking assist system of claim 1, wherein:
the first figure includes one portion showing a ratio of the first progress distance of the vehicle with respect to the total distance of the first path that the driver manually controls the movement of the vehicle from the position of the vehicle at the time which the parking space is found to the automatic parking control start position, and another portion showing the ratio of the first remaining distance of the vehicle with respect to the total distance of the first path, and
the second figure includes one portion showing a ratio of the second progress distance of the vehicle with respect to the total distance of the second path that the automatic parking control unit controls the movement of the vehicle from the automatic parking control start position to the parking space, and another portion showing the ratio of the second remaining distance of the vehicle with respect to the total distance of the second path.

10. The smart parking assist system of claim 1, wherein:
the first path that the driver manually controls the movement of the vehicle from the position of the vehicle at the time which the parking space is found to the automatic parking control start position is generated as a straight path, and
the second path that the automatic parking control unit controls the movement of the vehicle from the automatic parking control start position to the parking space is generated as a curved path.

11. The smart parking assist system of claim 1, wherein the first figure simultaneously showing the first progress distance and the first remaining distance of the vehicle in the first path that the driver manually controls the movement of the vehicle from the position of the vehicle at the time which the parking space is found to the automatic parking control start position, and the second figure simultaneously showing the second progress distance and the second remaining distance of the vehicle in the second path that the automatic parking control unit controls the movement of the vehicle from the automatic parking control start position to the parking space are displayed simultaneously at separate areas.

12. A method for controlling a smart parking assist system, the method comprising:

searching a surrounding space of a vehicle by a sensor mounted on the vehicle and finding a parking space for automatic parking of the vehicle;

generating a path for parking the vehicle from a position of the vehicle at a time which the parking space is found to the parking space, wherein the path for parking the vehicle includes a first path that a driver manually controls a movement of the vehicle from the position of the vehicle at the time which the parking space is found to an automatic parking control start position where an automatic parking control unit starts to control the movement of the vehicle, and a second path that the automatic parking control unit controls the movement of the vehicle from the automatic parking control start position to the parking space;

displaying a first figure simultaneously showing a first progress distance and a first remaining distance of the vehicle in the first path that the driver manually controls the movement of the vehicle from the position of the vehicle at the time which the parking space is found to the automatic parking control start position, and a second figure simultaneously showing a second progress distance and a second remaining distance of the vehicle in the second path that the automatic parking control unit controls the movement of the vehicle from the automatic parking control start position to the parking space; and in response that a ratio of the first remaining distance of the first path with respect to a total distance of the first path before the vehicle reaches the automatic parking control start position, or a ratio of the second remaining distance of the second path with respect to a total distance of the second path before the vehicle reaches the parking space is equal to or less than a predetermined ratio, outputting an alarm.

13. The method of claim 12, further comprising controlling the movement of the vehicle according to the automatic parking control in the second path that the automatic parking control unit controls the movement of the vehicle from the automatic parking control start position to the parking space.

14. The method of claim 12, wherein:

the first figure simultaneously displays a ratio of the first progress distance of the vehicle in the first path with respect to the total distance of the first path that the driver manually controls the movement of the vehicle from the position of the vehicle at the time which the parking space is found to the automatic parking control start position, and the ratio of the first remaining distance of the vehicle in the first path with respect to the total distance of the first path; and the second figure simultaneously displays the ratio of the second progress distance of the vehicle in the second path with respect to the total distance of the second path that the automatic parking control unit controls the movement of the vehicle from the automatic parking control start position to the parking space, and the ratio of the second remaining distance of the vehicle in the second path with respect to the total distance of the second path.

15. The method of claim 12, wherein the first figure and the second figure are simultaneously displayed in separate areas.

16. The method of claim 12, wherein:

the first figure shows a ratio between the first progress distance and the first remaining distance of the vehicle in the first path that the driver manually controls the movement of the vehicle from the position of the vehicle at the time which the parking space is found to the automatic parking control start position, and the second figure shows a ratio between the second progress distance and the second remaining distance of the vehicle in the second path that the automatic parking control unit controls the movement of the vehicle from the automatic parking control start position to the parking space.

17. The method of claim 12, wherein:

the first figure includes one portion showing a ratio of the first progress distance of the vehicle in the first path with respect to the total distance of the first path that the driver manually controls the movement of the vehicle from the position of the vehicle at the time which the parking space is found to the automatic parking control start position, and another portion showing the ratio of the first remaining distance of the vehicle in the first path with respect to the total distance of the first path, and the second figure shows a ratio between the second progress distance and the second remaining distance of the vehicle in the second path that the automatic parking control unit controls the movement of the vehicle from the automatic parking control start position to the parking space.

18. The method of claim 12, wherein:

the first figure simultaneously displays a ratio of the first progress distance of the vehicle in the first path with respect to the total distance of the first path that the driver manually controls the movement of the vehicle from the position of the vehicle at the time which the parking space is found to the automatic parking control start position and the ratio of the first remaining distance of the vehicle in the first path with respect to the total distance of the first path, and the second figure simultaneously displays a ratio of the second progress distance of the vehicle in the second path with respect to the total distance of the second path that the automatic parking control unit controls the movement of the vehicle from the automatic parking control start position to the parking space and the ratio of the second remaining distance of the vehicle with respect to the total distance of the second path.

19. The method of claim 12, wherein:

the first path that the driver manually controls the movement of the vehicle from the position of the vehicle at the time which the parking space is found to the automatic parking control start position is generated as a straight path, and the second path that the automatic parking control unit controls the movement of the vehicle from the automatic parking control start position to the parking space is generated as a curved path.

20. The method of claim 12, wherein the first figure simultaneously showing the first progress distance and the first remaining distance of the vehicle in the first path that the driver manually controls the movement of the vehicle from the position of the vehicle at the time which the parking space is found to the automatic parking control start position, and the second figure simultaneously showing the second progress distance and the second remaining distance of the vehicle in the second path that the automatic parking control unit controls the movement of the vehicle from the automatic parking control start position to the parking space are displayed simultaneously at separate areas.

\* \* \* \* \*